(12) United States Patent
Kowaguchi

(10) Patent No.: US 6,201,973 B1
(45) Date of Patent: Mar. 13, 2001

(54) MOBILE COMMUNICATION APPARATUS

(75) Inventor: Satoshi Kowaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/049,147

(22) Filed: Mar. 27, 1998

(30) Foreign Application Priority Data

Mar. 28, 1997 (JP) .................................... 9-078173

(51) Int. Cl.⁷ .................................................. H04Q 7/20
(52) U.S. Cl. .................... 455/456; 455/528; 342/357.05; 342/357.09; 342/357.1; 342/450
(58) Field of Search .................... 455/456, 457, 455/440, 69, 422, 552, 517, 527, 528; 342/357.05, 357.09, 357.14, 357.1, 357.13, 450, 457, 463

(56) References Cited

U.S. PATENT DOCUMENTS

| 5,056,106 | * | 10/1991 | Wang et al. ........................ 342/458 |
| 5,442,805 | * | 8/1995 | Sagers et al. ........................ 455/456 |
| 5,548,296 | * | 8/1996 | Matsuno ................................ 342/457 |
| 5,629,710 | * | 5/1997 | Sawada ................................ 455/456 |
| 5,878,330 | * | 3/1999 | Naumann .............................. 455/71 |
| 5,943,014 | * | 8/1999 | Gilhousen ............................ 342/465 |
| 5,982,324 | * | 11/1999 | Watters et al. .................. 342/357.06 |

FOREIGN PATENT DOCUMENTS 5-344050   12/1993   (JP) .

* cited by examiner

*Primary Examiner*—Lee Nguyen
(74) *Attorney, Agent, or Firm*—McGuireWoods, LLP

(57) ABSTRACT

A mobile communication apparatus having a transceiver is provided with a location calculator which calculates a location of the mobile communication apparatus based on three radio control signals each received from a different base station. A plurality of transmission inhibition areas of data are stored in a memory and the transceiver is controlled depending on whether the location of the mobile communication apparatus is within one of the transmission inhibition areas.

4 Claims, 6 Drawing Sheets

TRANSMISSION INHIBITION AREA TABLE

| TRANSMISSION INHIBITION AREA | AREA DATA | | | |
|---|---|---|---|---|
| | LATITUDE | | LONGITUDE | |
| HOSPITAL A | $a_1 N$ | $a_2 N$ | $a_3 E$ | $a_4 E$ |
| HOSPITAL B | $b_1 N$ | $b_2 N$ | $b_3 E$ | $b_4 E$ |
| ⋮ | ⋮ | ⋮ | ⋮ | ⋮ |

DOWN LINK CONTROL CHANNEL

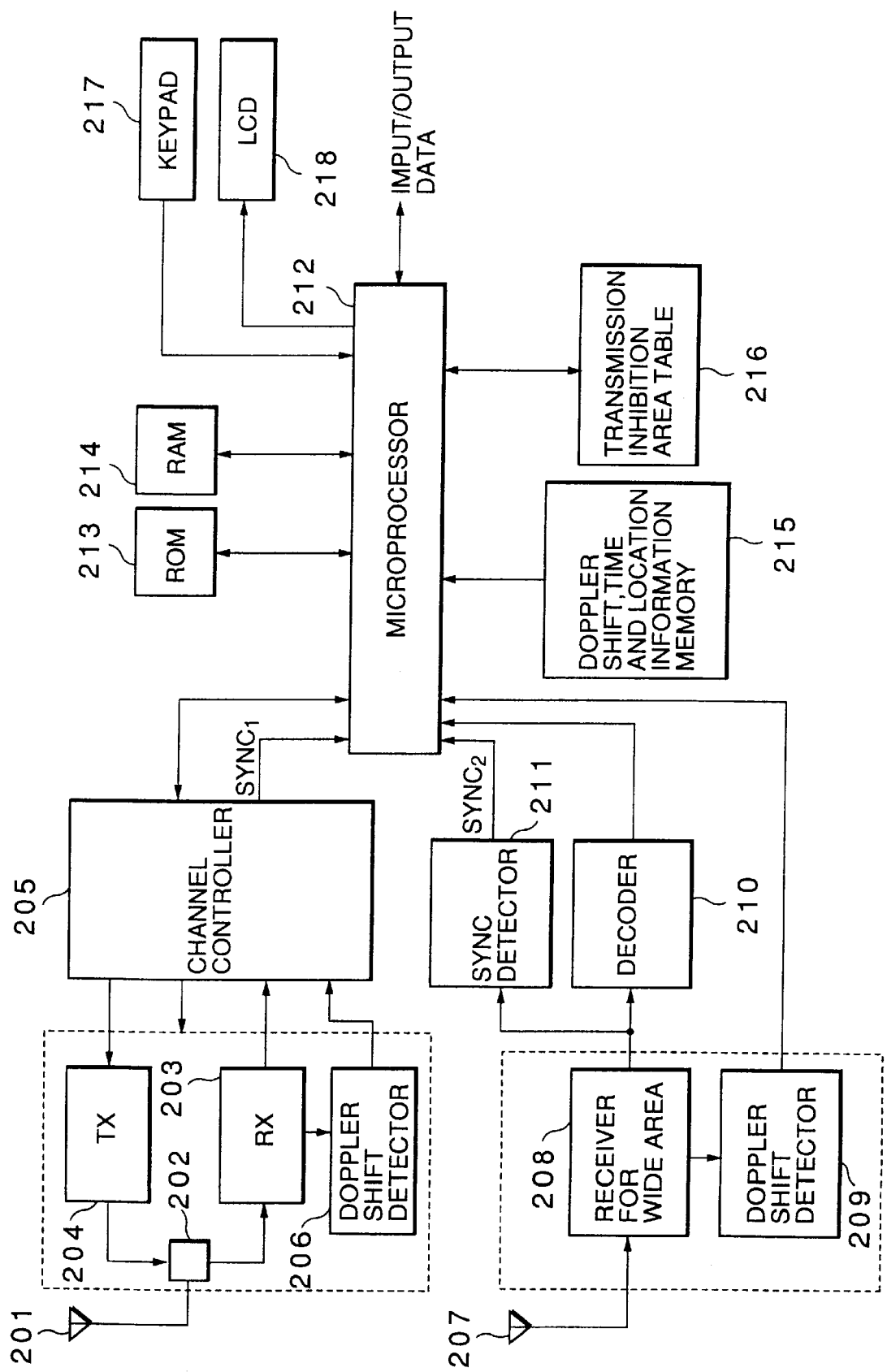

FIG.4

TRANSMISSION INHIBITION AREA TABLE

| TRANSMISSION INHIBITION AREA | AREA DATA | | | |
|---|---|---|---|---|
| | LATITUDE | | LONGITUDE | |
| HOSPITAL A | $a_1 N$ | $a_2 N$ | $a_3 E$ | $a_4 E$ |
| HOSPITAL B | $b_1 N$ | $b_2 N$ | $b_3 E$ | $b_4 E$ |
| ⋮ | ⋮ | ⋮ | ⋮ | ⋮ |

MOBILE COMMUNICATION APPARATUS

BACKGROUND OF THE INVENTION

1. Field of the Invention

The present invention relates to a mobile communications system and, in particular to a mobile communication apparatus having a transmission inhibition function.

2. Description of the Prior Art

With the wide use of high-tech gear such as computers and digital devices having microprocessors therein, there has been a growth in the case where operations of the high-tech gear are adversely affected by radio waves emitted from radio communication equipment such as mobile telephone terminals. Especially, in the case of hospital, it may be a serious problem.

As another example, in the case where assigned frequency bands vary from nation to nation in a region having the borders of a plurality of nations such as Europe, it is unlawful to transmit a radio signal within a different nation.

To prevent undesirable and illegal transmission as described above, there have been proposed several mobile communications systems and mobile terminals having a capability of inhibiting radio transmission.

In Japanese Patent Unexamined Publication No. 5-344050, a mobile communication apparatus is provided with a database storing transmission permitted areas and a location detector using a satellite communication system such as GPS (Global Positioning System). When it is located out of transmission permitted areas, the transmission operation is inhibited.

However, the mobile communication apparatus is not suitable for location detection of a relatively small area such as building location. Further, the mobile communication apparatus needs a GPS device as the location detector.

In a mobile communication system as disclosed in Japanese Patent Unexamined Publication No. 7-87568, a mobile terminal is provided with a database storing transmission and reception inhibition areas and a location detector using GPS. When the mobile terminal is located within a reception inhibition area, the system transmits a signal to the mobile terminal and thereby an audible alert is inhibited. As another system, a system side including base stations and a control center is provided with the database storing transmission and reception inhibition areas and the location detector. When the mobile terminal is located within a transmission inhibition area, the system side informs a user that the user is located in a transmission inhibition area and then the transmission operation is inhibited.

However, the system needs to transmit a message signal to the mobile terminal so as to inform the user of transmission or reception inhibition area. Further, the mobile terminal also needs a GPS device as the location detector.

SUMMARY OF THE INVENTION

An object of the present invention is to provide a mobile communication apparatus which can achieve reliable transmission inhibition without transmitting any specific signal.

Another object of the invention is to provide a mobile communication apparatus which can detect the precise location thereof and achieve reliable transmission inhibition at a relatively small area such as a building location.

According to the present invention, a mobile communication apparatus including a transceiver for receiving and transmitting a radio signal for use in a plurality of service areas formed by a plurality of base stations is provided with a location calculator for calculating a location of the mobile communication apparatus within the service areas based on three radio control signals each received from a different base station. A plurality of transmission inhibition areas of data are stored and the transceiver in controlled depending on whether the location of the mobile communication apparatus is within one of the transmission inhibition areas.

The location calculator may be comprised of a detector for detecting a Doppler shift frequency of a radio control signal received from each of the three base stations. A distance between the mobile communication apparatus and each of the three base stations is calculated from the Doppler shift frequency of the radio control signal and the location of the mobile communication apparatus to determined from three distances calculated by the distance calculator.

The location calculator may be comprised of a detector for detecting reception time of a radio control signal received from each of the three base stations, wherein the radio control signal conveys transmission time information. A distance between the mobile communication apparatus and each of the three base stations in calculated based on time elapsed between transmission and reception of the radio control signal obtained from the reception time and the transmission time. The location of the mobile communication apparatus is determined from three distances calculated by the distance calculator.

BRIEF DESCRIPTION OF THE DRAWINGS

FIG. 3 is a block diagram showing an embodiment of a mobile communication apparatus according to the present invention;

FIG. 4 is a schematic diagram showing an example of a transmission inhibition area table provided in the mobile communication apparatus;

DESCRIPTION OF THE PREFERRED EMBODIMENTS

Figure 1:
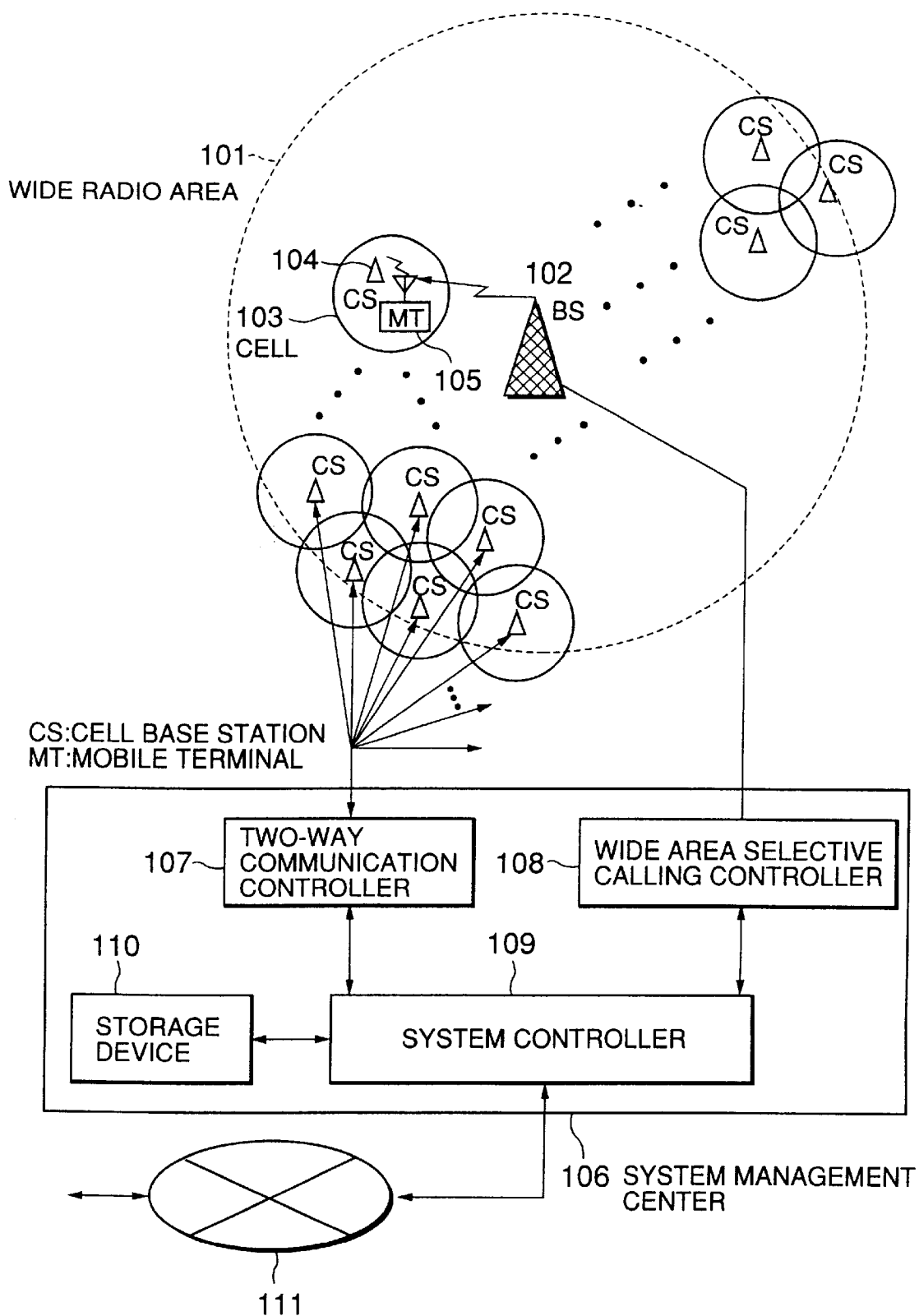
FIG. 1 is a schematic block diagram showing an example of the system configuration of a communication system according to the present invention.

Referring to FIG. 1, a communication system is composed of a wide-area base station (BS) 102 for forming a wide radio area 101 and a plurality of cell base stations (CS) 104 for forming narrow radio areas (cells) 103 that are arranged in cellular form. A mobile terminal (MT) 105 which is carried by an authorized user is called through the wide-area base station 102 or a nearest cell base station 104 and makes a two-way communication through the nearest cell base station 104.

The above communication system is controlled by a system management center 106. That is, the system management center 106 unifies and controls the wide-area base station 102 and the plurality of cell base stations 104. The system management center 106 is comprised of a two-way communication controller 107 that is connected to the plurality of cell base stations 104, a wide-area selective calling controller 108 that is connected to the wide-area base station 102, a system controller 109 for controlling the two-way communication controller 107 and the wide-area selective calling controller 108, and a storage device 110 for storing data received from the respective terminals. Further, the system management center 106 can be connected, via a public network 111, to the terminal of an opposite party to communicate with.

The wide-area base station 102 and each cell base station CS synchronously transmit a control signal including necessary information for determining the location of a mobile terminal at regular intervals. Therefore, a mobile terminal 105 located in a cell 103 as shown in FIG. 1 receives two control signals from the wide-area base station 102 and the cell base station 104, respectively. Even when the two control signals have been simultaneously transmitted, the arrival times of the control signals are different, depending on propagation distances.

Such different arrival times can be used to determine the respective distances. Further, Doppler shift frequency may be used to determine the location of a mobile terminal as described later.

Figure 2A:
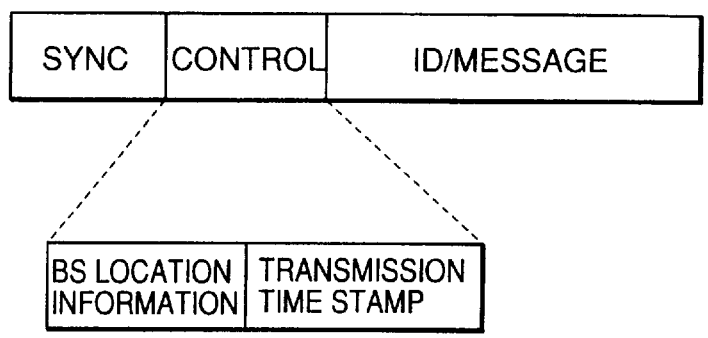
FIG. 2A is a diagram showing the format of a signal transmitted by a base station of a wide-area selective calling communication system.

Referring to FIG. 2A, a selective calling signal transmitted by a wide-area base station 102 includes a synchronization signal SYNC, a control signal and identification (ID) or message data. The control signal includes BS location information and transmission time stamp information which are used for location calculation. The BS location information may be the latitude and longitude of the wide-area base station 102. The transmission time stamp information indicates the time instant when the signal is transmitted by the wide-urea base station 102.

If a table containing map data of each base station is provided in a mobile terminal, the BS location information is replaced with BS identification code. Such a control signal is not specific but ordinary in a selective calling system.

Figure 2B:
FIG. 2B is a diagram showing the format of a control signal transmitted by a cell base station of a two-way communication system.

Referring to FIG. 2B, a down-link control channel signal transmitted by a cell base station CS includes a synchronization signal SYNC, source identification CS-ID, CS location information, and transmission time stamp information. The CS location information may be the latitude and longitude of the cell base station CS. The transmission time stamp information indicates the time instant when the down-link control channel signal is transmitted by the cell base station CS.

If the mobile terminal is provided with the table containing map data of each base station, the CS location information is not necessary because the source identification CS-ID can be used to retrieve necessary information from the table. Such a control signal is not specific but ordinary in mobile telephone systems.

Referring to FIG. 3, a mobile terminal is provided with a two-way communication system and a wide-area communication system. An antenna 201 is connected to a radio transceiver having an antenna switch 202 connected to a receiver 203 and a transmitter 204. The receiver 203 demodulates a radio signal received from a cell base station and outputs received data to a channel controller 205. The transmitter 204 modulates a carrier wave according to transmission data received from the channel controller 205 and outputs a resulting radio-frequency signal to the antenna 201 via the antenna switch 202.

The two-way communication system further includes a Doppler shift detector 206 which detects a Doppler shift frequency from the received radio signal and outputs the magnitude of Doppler shift frequency to the channel controller 205.

An antenna 207 is connected to a wide-area receiver 208 for receiving a radio selective calling signal from the wide-area base station 102. The wide-area receiver 208 is connected to a Doppler shift detector 209 which detects a Doppler shift frequency from the received radio selective calling signal. The wide-area receiver 208 demodulates the radio selective calling signal and outputs received data to a decoder 210 and a sync detector 211.

A microprocessor 212 performs the operations of the mobile terminal by executing programs including a location determination program and a transmission inhibition control program stored in a read-only memory (ROM) 213. The microprocessor 212 is further connected to a random-access memory (RAM) 214, a memory 215 and a transmission inhibition area table 216. The RAM 214 is used to store received messages and other necessary information and the memory 215 is used to store Doppler shift data, arrival time, location and time stamp information of received control signals. The transmission inhibition area table 216 previously stores area data in which radio transmission is inhibited.

The microprocessor 212 receives a call sync detection signal and a wide-area sync detection signal from the channel controller 205 and the sync detector 211, respectively. When receiving the cell sync detection signal, the microprocessor 212 inputs received data from the channel controller 205 and stores the arrival time of the cell sync detection signal, the CS location information and the transmission time stamp information included in the received data onto the memory 215. When receiving the wide-area sync detection signal, the microprocessor 212 inputs received data from the decoder 210 and stores the arrival time of the wide-area sync detection signal, the BS location information and the transmission time stamp information included in the received data onto the memory 215.

As described before, in the case where the mobile terminal is provided with the table of base station map data, the microprocessor 212 may search the table of base station map data for the BS and CS identification data included in the received data and store the corresponding location information onto the memory 215.

The ROM 213 stores the location determination program and the transmission inhibition control program. As will be described in detail, the microprocessor 212 performs location calculation of the mobile terminal by using the CS and BS location information, the respective arrival time differences and the respective magnitudes of Doppler shift frequency of the selective calling signal and at least two down-link control channel signals.

Further, a keypad 217, a display 218 such as a liquid crystal display (LCD), a speaker and a microphone (not shown), and an alert system such as a speaker or beeper (not shown) are connected to the microprocessor 212. A message indicating transmission inhibition/permission, a received message and other necessary information are displayed on the display 218 in accordance with a user's instruction input through the keypad 217.

As shown in FIG. 4, the transmission inhibition area table 216 stores hospital location data (Latitude and Longitude) in this embodiment. Since some electromagnetic-sensitive medical devices are provided within a hospital building, it is very important to inhibit undesirable radio transmission. In the transmission inhibition area table 216, for example, a hospital A is located on an area defined by Latitude $a_1$ North to $a_2$ North and Longitude $a_3$ East to $a_4$ East.

Figure 5:
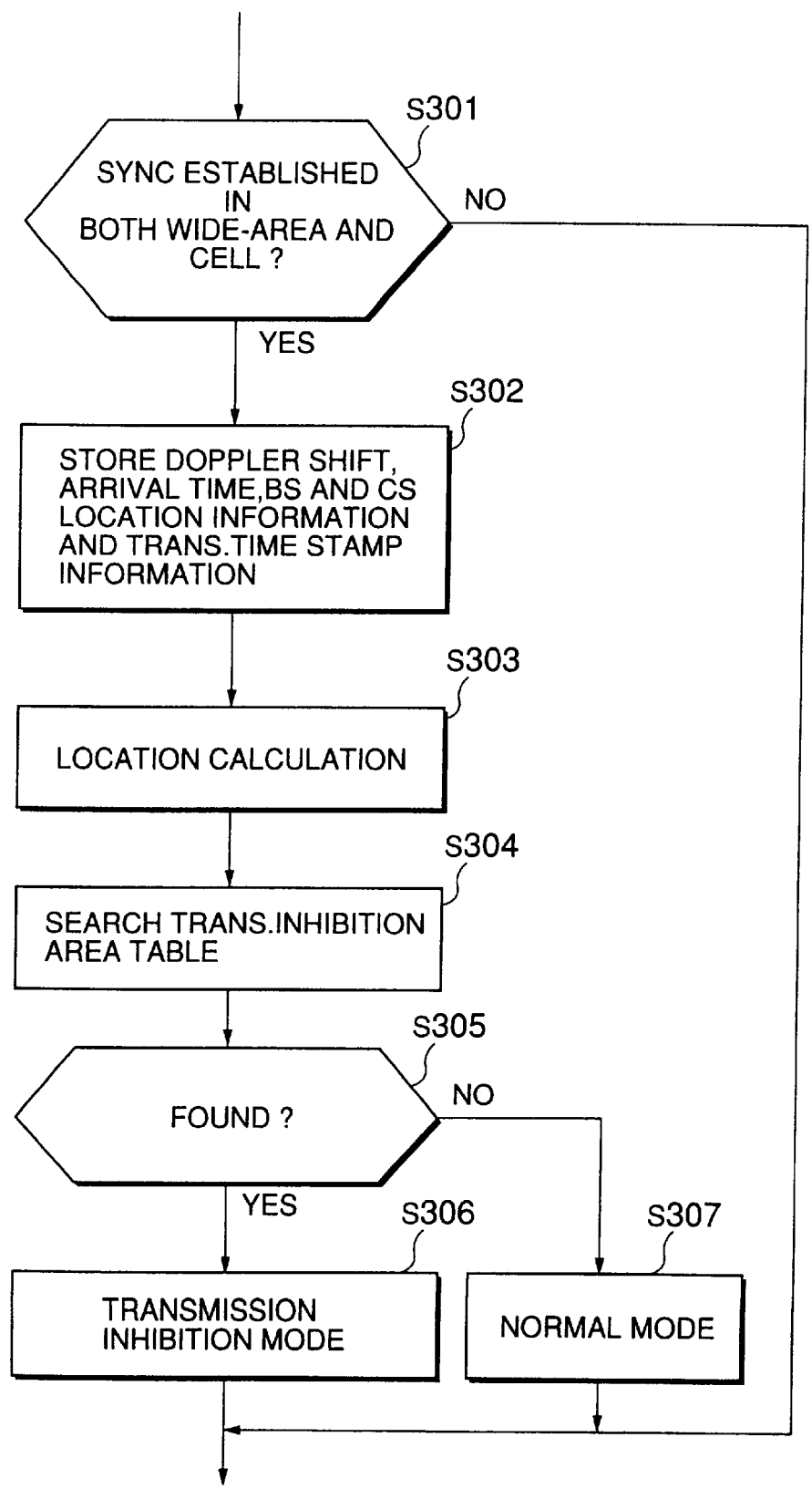
FIG. 5 is a flowchart showing an operation of the embodiment.

Referring to FIG. 5, when receiving at lease two cell sync detection signals and the wide-area sync detection signal from the channel controller 205 and the sync detector 211, respectively (YES in step S301), the microprocessor 212 stores the respective Doppler shift magnitudes and the arrival times of the CS and BS transmission signals, the CS and BS location information and the CS and BS transmission time stamp information onto the memory 215 (step S302).

Subsequently, the microprocessor 212 performs location calculation using the above information stored in the memory 215 (step S303). When the mobile terminal is moving, the detected Doppler shift frequency may be used to detect a change of the location of the mobile terminal with respect to the BS base station and two cell base stations. Further, the microprocessor 212 can calculate a distance between the mobile terminal and the wide-area base station based on the time difference between transmission and arrival times and similarly calculates two distances between the mobile terminal and two adjacent cell base stations, respectively.

The location of the mobile terminal can be determined from the three distances calculated as described above and the location information of corresponding base stations.

When the location has been calculated, the microprocessor 212 searches the transmission inhibition area table 216 for the calculated location of the mobile terminal itself (steps S304 and S305). If a transmission inhibition area including the calculated location is found, that is, the calculated location is within one of the transmission inhibition areas (YES in step S305), the microprocessor 212 set the channel controller to the radio transmission inhibition mode (step S306) and further controls the display 218 so that a message of the radio transmission inhibition mode is displayed on the screen.

On the other hand, when the calculated location is not found in the table 216, that is, it is out of the transmission inhibition areas (NO in stop S305), the microprocessor 212 set the channel controller to a normal mode in which radio transmission is permitted (step S307).

Figure 6:
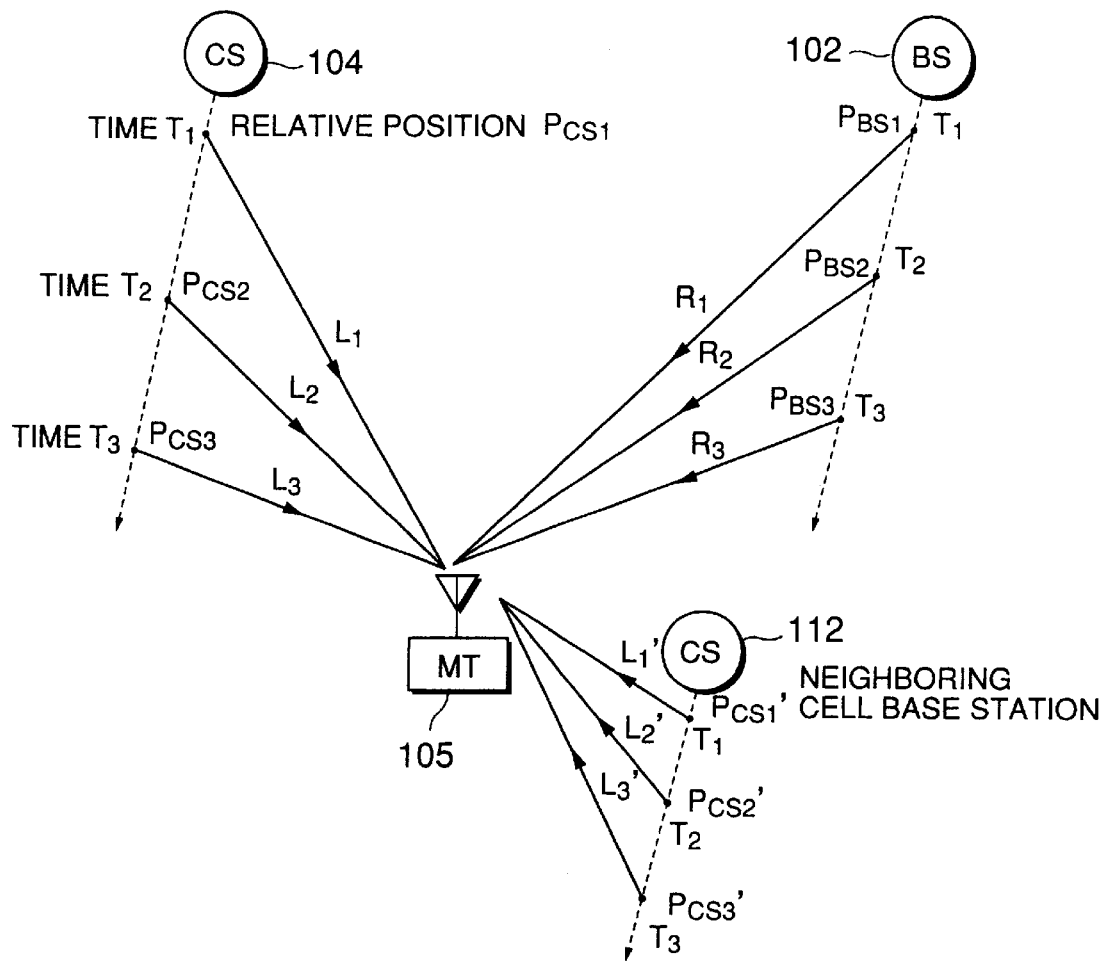
FIG. 6 is a schematic diagram for explaining a first example of location determination of the embodiment.

Referring to FIG. 6, when the mobile terminal is moving, Doppler shift frequencys are used to calculate the distance between the mobile terminal 105 and each of base stations. Assuming that the mobile terminal 105 is moving among the wide-area base station 102 and two adjacent cell base stations 104, 112, wherein the control signals are simultaneously transmitted by the cell base stations 104, 112 and the wide-area base station 102 at regular intervals.

At time $T_1$, the relative position of the cell base station 104 to the mobile terminal 105 is denoted by $P_{CS1}$ and the distance between them is denoted by $L_1$. the relative position of the cell base station 112 to the mobile terminal 105 is denoted by $P_{CS1}'$ and the distance between them is denoted by $L_1'$, and the relative position of the wide-area base station 102 is denoted by $P_{BS1}$ and the distance between them is denoted by $R_1$. Similarly, at time $T_2$, the relative positions of the cell base station 104 and 112 are denoted by $P_{CS2}$ and $P_{CS2}'$, the relative position of the wide-area base station 102 by $P_{BS2}$, and the respective distances between the mobile terminal 105 and the cell base stations 104, 112 are denoted by $L_2$ and $L_2'$, and the distance between the mobile terminal 105 and the wide-area base station 102 is denoted by $R_2$. It is the same with at time $T_3$.

In general, Doppler shift frequency $\Delta f$ is represented by $\Delta f = f \times \Delta L/L$, where f is a transmission frequency at a transmitting point and L is a distance between the transmitting point and a receiving point. In this case, assuming that a summation of Doppler shift frequency $\Delta f$ from $T_1$ to $T_2$ is $N_1$, it is known that the summation $N_1$ defines a hyperbola keeping $(L_2-L_1)$ constant, where $(L_2-L_1)$ is a distance difference between $L_1$ and $L_2$. Similarly, a summation $N_2$ of Doppler shift frequency from $T_2$ to $T_3$ defines a hyperbola keeping the distance difference $(L_3-L_2)$ constant. Therefore, a distance L between the mobile terminal 105 and the cell bass station 104 is determined by adding up the Doppler shift frequency $\Delta f$. It is the same with the wide-area base station 102 and another cell base station 112.

In this manner, the respective distances from the mobile terminal 105 to the base stations 102, 104 and 112 are obtained. Therefore, the location (here, latitude and longitude) of the mobile terminal 105 can be calculated by using the three distances and the location information (latitude and longitude) of the base stations 102, 104 and 112.

In the case where the transmission frequency is 910 MHz and a user is walking at 3 miles per hour, a maximum Doppler shift frequency is ±4 Hz. Therefore, if the mobile terminal 105 is provided with the Doppler shift detectors 206 and 209 which can detect such a frequency shift, very precise location determination can be achieved. Further, the location determination using Doppler effect does not require a specific signal for location determination.

Figure 7:
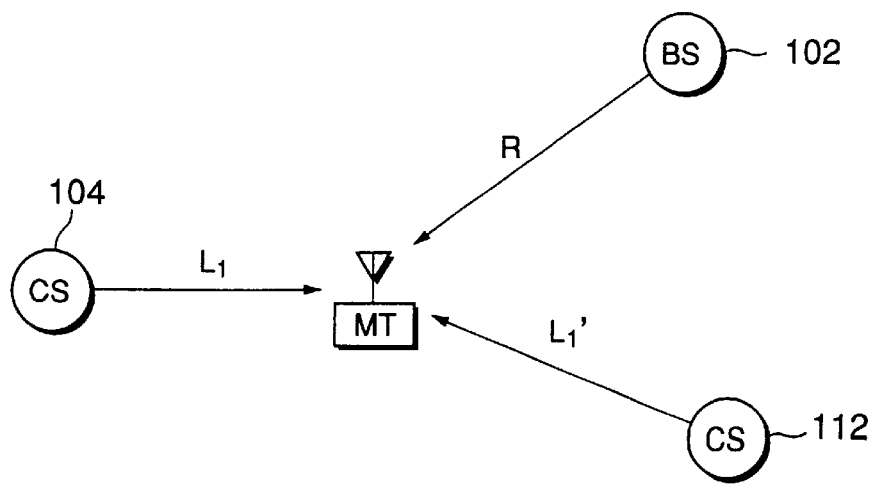
FIG. 7 is a schematic diagram for explaining a second example of location determination of the embodiment.

Referring to FIG. 7, the microprocessor 212 also calculates a distance R between the mobile terminal 105 and the wide-area base station 102 by calculating a time difference between the transmission time and the arrival time of the selective calling signal. Similarly, the respective distances $L_1$ and $L_2$ between the mobile terminal 105 and two adjacent cell base stations 103 and 112 are also calculated. The location of the mobile terminal can be determined from the location information of the three base stations 102, 103 and 112 and the corresponding distances R, $L_1$ and $L_2$. This location calculation method can be used even when the mobile terminal is at rest.

Since this location determination uses the time stamp information and the location information of a base station in a control signal, no specific signal for location determination is required.

What is claimed is:

1. A mobile communication apparatus for use in a one-way communication system including a one-way station and a two-way communication system including a plurality of two-way stations, wherein a plurality of two-way communication areas are arranged in cellular form and are overlapped with a one-way communication area, the mobile communication apparatus comprising:

a transceiver for the two-way communication system;

a receiver for the one-way communication system;

a location calculator for calculating a location of the mobile communication apparatus based on three radio control signals received from the one-way station and two adjacent two-way stations, respectively;

a storage for storing a plurality of transmission inhibition areas of data; and a controller for controlling the transceiver depending on whether the location of the mobile communication apparatus is within one of the transmission inhibition areas.

2. The mobile communication apparatus according to claim 1, wherein the location calculator comprises:

a detector for detecting reception time of a radio control signal received from each of the one-way station and two adjacent two-way stations, the radio control signal conveying transmission time information;

a distance calculator for calculating a distance between the mobile communication apparatus and each of the one-way station and two adjacent two-way stations based on time elapsed between transmission and reception of the radio control signal obtained from the reception time and the transmission time; and a location determiner for determining the location of the mobile communication apparatus from three distances calculated by the distance calculator.

3. The mobile communication apparatus according to claim 1, wherein the one-way station and the two-way stations base stations transmit radio control signals synchronously.

4. The mobile communication apparatus according to claim 1, wherein each of the three radio control signals convoys location information of the corresponding one of the three stations and transmission time information.

* * * * *